(Model.)
H. COTTRELL.
ROTARY CUTTER FOR FRUIT PARING MACHINES.
No. 284,823. Patented Sept. 11, 1883.
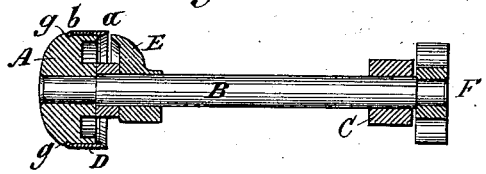
Fig. 2.
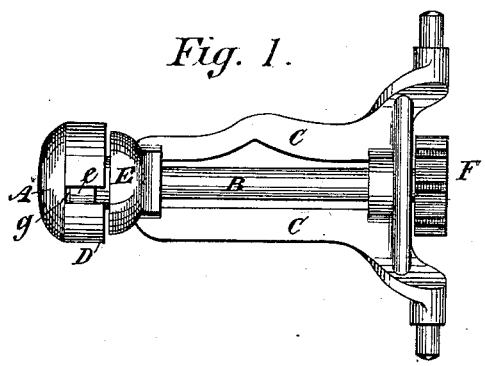
Fig. 1.
Fig. 3.
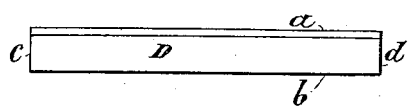
Fig. 4.
Fig. 5.
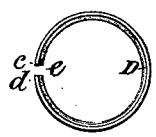
Fig. 6.
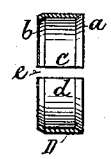
Witnesses
Jno Haynes
Ed L. Moran
Inventor
Herbert Cottrell
by his Attorneys
Brown & Brown

UNITED STATES PATENT OFFICE.

HERBERT COTTRELL, OF NEWARK, NEW JERSEY.

ROTARY CUTTER FOR FRUIT-PARING MACHINES.

SPECIFICATION forming part of Letters Patent No. 284,823, dated September 11, 1883.

Application filed July 28, 1883. (Model.)

*To all whom it may concern:*

Be it known that I, HERBERT COTTRELL, of Newark, in the county of Essex and State of New Jersey, have invented a certain new and useful Improvement in Rotary Cutters for Fruit-Paring Machines, of which the following is a specification.

My invention is or may be applicable to various kinds of fruit-paring machines using rotary cutters, but more especially to that class in which the fruit and the cutter rotate on axes transverse to each other, and in which the cutter also moves in a direction around the fruit transverse to the planes of rotation of the latter for the purpose of following the contour of the same.

The object of my invention is to provide a cutter having a cutting-edge of circular form of such cheap construction and so easily applied to and removed from the cutter-shaft or cutter-head that when worn too dull for further use it may be economically removed, thrown away, and replaced by a new one.

The invention consists in the combination, with a cylindrical or circular cutter-head, of an annular cutter having an opening across the circumference to allow of its being sprung onto the head, and to contract and hold itself thereon by its elasticity.

It further consists in a novel construction of such cutter and head, whereby the cutter is securely retained on the head.

In the drawings, Figure 1 is a plan view of a cutter-carriage containing a cutter-shaft carrying a cutter-head and cutter constructed according to my invention. Fig. 2 is a longitudinal section at right angles to Fig. 1. Fig. 3 is a side view of a straight strip of steel of which the annular cutter is to be made. Fig. 4 is an end view of the same. Fig. 5 is a face view of the cutter ready for use, and Fig. 6 is a transverse section of the same.

Similar letters of reference designate similar parts throughout the several views.

A designates a cutter-head, of cylindrical form, firmly attached to the end of a revolving spindle, B, which is mounted in the swinging frame C and furnished with a spur-gear, F, through which it is to receive rotary motion.

D designates the annular cutter, which may be made of a piece of steel, the original form of which is that of a flat straight blade, as shown in Figs. 3 and 4, which, after having one edge $a$ ground, is bent into a circular or ring shape, (shown in Fig. 5,) the two ends $c$ and $d$ being left with a slight opening, $e$, between them. The cutter thus formed has its interior of slightly smaller diameter than that portion of the cutter-head A which is to receive it, and is sprung onto the said portion of the head, in the back of which there is provided a circumferential groove, into which the back edge, $b$, of the cutter is contracted, as shown in Fig. 1. The cutter is prevented from turning on the cutter-head by its elasticity, which tends to contract it, and is further secured in place by the contraction of its back edge, $b$, into the groove $g$.

E designates a guard for the cutter D, secured to the swinging frame C, and arranged to operate in conjunction with the cutter in the ordinary way.

Having described my invention, what I claim as new, and desire to secure by Letters Patent, is—

1. The combination, with the cylindrical or circular cutter-head, of an annular cutter having an opening across its circumference and adapted to the head, to contract and hold itself securely thereon by its elasticity, substantially as herein described.

2. The combination, with the circular cutter-head A, provided with a groove, $g$, of the cutter D, having its back edge set into the said groove, substantially as and for the purpose herein described.

HERBERT COTTRELL.

Witnesses:
FREDK. HAYNES,
ED. L. MORAN.